United States Patent
Cao

(10) Patent No.: US 7,815,238 B2
(45) Date of Patent: Oct. 19, 2010

(54) CLOSED TWO-WHEEL MOTORCYCLE WITH RETRACTABLE FLOORS

(76) Inventor: Haiyang Cao, No. 77, Building 75, Market Court, Linghe District, Jinzhou City, Liaoning Province 121000 (CN)

( * ) Notice: Subject to any disclaimer, the term of this patent is extended or adjusted under 35 U.S.C. 154(b) by 542 days.

(21) Appl. No.: 11/632,133

(22) PCT Filed: Jul. 8, 2005

(86) PCT No.: PCT/CN2005/001005

§ 371 (c)(1), (2), (4) Date: Nov. 28, 2007

(87) PCT Pub. No.: WO2006/005254

PCT Pub. Date: Jan. 19, 2006

(65) Prior Publication Data

US 2008/0197673 A1 Aug. 21, 2008

(30) Foreign Application Priority Data

Jul. 12, 2004 (CN) .................. 2004 1 0020962

(51) Int. Cl.
*B62K 11/00* (2006.01)
*B62H 1/00* (2006.01)
*B62D 25/20* (2006.01)

(52) U.S. Cl. .............. 296/97.23; 296/78.1; 296/193.07; 280/763.1

(58) Field of Classification Search ............ 296/193.07, 296/97.23, 146.1, 155, 26.06, 78.1; 280/304.3, 280/763.1–767

See application file for complete search history.

(56) References Cited

U.S. PATENT DOCUMENTS

| | | | | | |
|---|---|---|---|---|---|
| 309,641 | A | * | 12/1884 | Mitchener | 298/28 |
| 2,589,023 | A | * | 3/1952 | Pattner | 280/301 |
| 3,164,261 | A | * | 1/1965 | Larson | 280/764.1 |
| 3,767,000 | A | * | 10/1973 | Smith | 180/16 |
| 5,685,388 | A | * | 11/1997 | Bothwell et al. | 180/219 |
| 6,685,208 | B1 | * | 2/2004 | Cowie | 280/293 |
| 6,942,053 | B2 | * | 9/2005 | Hinton | 180/209 |
| 7,357,416 | B2 | * | 4/2008 | Wagner | 280/764.1 |
| 2003/0090097 | A1 | * | 5/2003 | Ranc | 280/767 |
| 2005/0034910 | A1 | * | 2/2005 | Hinton | 180/209 |

FOREIGN PATENT DOCUMENTS

| | | |
|---|---|---|
| CN | 2187139 Y | 1/1995 |
| CN | 2198185 | 5/1995 |

(Continued)

*Primary Examiner*—Patricia L Engle
(74) *Attorney, Agent, or Firm*—Banner & Witcoff, Ltd.

(57) ABSTRACT

A closed two-wheel motorcycle including a closed cab with a door arranged around the motorcycle structure and having retractable floors for the driver's feet, separated from each other, which can be depressed toward the ground and are resettable by spring members is presented. Each retractable floor is connected with an external rocker arm hinged at a rear section of the motorcycle and a sliding member guided by a sleeve at a front section of the cab. The spring members operate between an upper portion of the sliding members and the front section of the cab, while locking brakes cooperate, at rest, with the sliding members for holding depressed the floor portions against the action of the spring members.

17 Claims, 7 Drawing Sheets

FOREIGN PATENT DOCUMENTS

| | | |
|---|---|---|
| CN | 2263046 | 9/1997 |
| CN | 2283609 Y | 6/1998 |
| CN | 2288127 Y | 8/1998 |
| CN | 2318109 Y | 5/1999 |
| CN | 2350283 Y | 11/1999 |
| FR | 2768389 | 3/1999 |
| WO | 03062037 | 7/2003 |

* cited by examiner

CLOSED TWO-WHEEL MOTORCYCLE WITH RETRACTABLE FLOORS

This application is a National Stage application of PCT application PCT/CN2005/001005 filed 8 Jul. 2005, which was published in Chinese under PCT Article 21(2) on 8 Jul. 2005, which claims the priority of Chinese Patent Application No. 200410020962.X, filed 12 Jul. 2004. This application is incorporated herein by reference in its entirety.

TECHNICAL FIELD

This invention relates to a type of vehicle, specifically a closed two-wheel motorcycle with retractable floor.

BACKGROUND OF THE INVENTION

The two-wheel motorcycle is a type of common vehicle, which has the advantages of small dimensions, low price, low-cost, easy-use compared with the ones of an automobile. At the same time, however, this type of vehicle has disadvantages as far as safety and comfort are concerned. In order to overcome these shortcomings, many people have made great efforts on it. In short, there are three general ways to solve these problems:

The first way is to equip the motorcycle with a windscreen in the front of the vehicle and a cage construction over or behind the motorcycle, as in BMW type C1, but the shortcomings are that there is no protection on the two sides of the motorcycle, therefore this does not completely solve the safety and comfort problem previously mentioned.

The second way is to equip the motorcycle with a closed surrounding shell, as in Chinese patent application N96248476.8, which discloses a kind of "closed two-wheel motorcycle." Its structure is like the one of a car, which includes a closed structure around the motorcycle, with doors on both sides and in which each door is divided into two parts: a top part and a bottom part, which are connected by a hinge, so that the bottom part opens on the outside, in order to let the driver's feet touch the ground when the motorcycle is to slow down or to stop. But it has some problems:
1. The top and bottom parts are connected by a hinge and the bottom part is made of flexible material so to allow the driver's leg to stretch out to touch the ground; therefore, this structure is not completely closed.
2. It is not easy to open the door and it results rather complicated.
3. At the time to slow down or to stop the motorcycle, the driver needs to stretch out the feet to balance the motorcycle while the motor is moving: if the driver is not careful, it's very easy for the driver's feet to be caught outside the door, therefore this is a very serious safety concern.

The third way is to add a shell around the two-wheel motorcycle, such as in the Chinese patent application N.98106572.4, which also discloses a kind of closed two-wheel motorcycle. This solution equips the motor-cycle with auxiliary wheels and a controlling set, which can control a state of opening and closing so that it can command the auxiliary wheel to touch the ground to balance the motorcycle instead of the person's feet when the motor is to start or stop. But there are problems:
1. The structure is complicated and it is not easy to be controlled. Furthermore, once the controlling set does not work, it is very difficult to stop the motorcycle.
2 The amount of power needed to balance the motorcycle is directly related to the condition of the ground and the speed of the motorcycle; therefore, the auxiliary wheels extend to the ground by means of a complex controlling set. This cannot provide the proper power to support the motorcycle and also cannot follow the dynamics of the ground conditions and the speed of the motorcycle, like the previously mentioned example where the driver can control the vehicle with his feet. However the method provided by this vehicle is very difficult to adapt to and the driver might have control and handling problems.
3. Changing from one manner of driving to another requires very different approaches, so there are difficulties for a driver to follows the changes. When driving such a motorcycle, people must raise the auxiliary wheel. The motor has two connecting points with the ground, and it is the same as driving an old motor, so the driver must change the center of gravity of his own body and the engine to achieve balance. We call this situation as "two-wheel state of driving." When the motorcycle has four touching points with the ground, as the auxiliary wheel touching the ground, the driver need not consider the effect of balance with respect to the center of gravity of the motorcycle and the driver's body, and the motor can not be overturned because of un-balancing. We call this other situation as "multi-wheel state of driving." Under such other condition, the driver needs not to change the center of gravity of his own body and the engine to keep the vehicle in balance. Thus, the driver needs to change repeatedly from the former "state" to the later "state." The manner of driving changes drastically and it's hard for the driver to adapt to these changes, and also it has serious controlling difficulties and might require additional skills. So this solution adds dangerous factors in driving the motorcycle.

SUMMARY OF THE INVENTION

One object of the invention is to overcome the above mentioned technological problems, such as bad closing, handling difficulties, high driving skill needs, driver risks and others. Hereby, I provide a type of closed two-wheel motorcycle with retractable floor, with the following features: simple structure, ease of use, high safety and high reliability.

The invention adopts the following solutions to solve the above mentioned problems: The motorcycle is equipped with a closed cab. On the floor of the cab, retractable floors separated on both sides of the floor are installed, and in which each one of the retractable floors can move up and down through a rocker arm connected with the body of the motorcycle by a hinge.

A preferred solution is given by the retractable floor being connected to the back of the motor by means of the hinge and through the rocker arm.

A telescopic joint construction between the floor of the cab, and the retractable floor is also added to keep the cab sealed from the outside.

An optimal solution is a telescopic joint construction having a hood with a sleeve or several components connected together.

The invention includes a flexible resetting component between the floor of the cab and the retractable floor, or between the rocker arm and the body of the motor for resetting the retractable floor to the original position.

The invention can also include a sliding guide rod connected with the retractable floor and a guide sleeve in the cab for cooperating with the guide rod. Thus, this arrangement can guide the retractable floor to move up and down for the action of the guide rod and the guide sleeve.

The invention, adopts a locking set cooperating with the guide rod on the guide sleeve for the locking of the guide rod, and in which the locking set can be actuated automatically or manually.

For example, a locking set of manually actuated type can be arranged on the guide sleeve through a hinge and can include a locking brake which cooperates with the guide rod, and a steel chain which can control the locking brake on the guide sleeve, and in which the other side of the steel chain is connected with a lock handle. A return spring is inserted between the guide sleeve and the locking brake: upon the stop of the motorcycle, you can move the lock handle for the locking of the retractable floor by the fixing of the locking brake to the guide rod so as to keep the vehicle in parking condition. Once the vehicle is set in motion, you can release the lock handle for spacing away the locking brake from the guide rod and unlocking the retractable floor.

This solution provides gears on the matching position for both the locking brake and the guide rod, and in which the gear of the locking brake and the guide rod engage each other.

Further, the lower portion of the retractable floor can be covered with a wear-resisting layer. Thus, when the driver steps down the floor, the wear-resisting layer touches the ground while the forces of the driver can be directed toward the ground for balancing of the motorcycle.

This invention can also be equipped with a touching wheel under the retractable floor, and wherein a castor wheel is first chosen for such touching wheel.

The mentioned touching wheel can be fixed on the retractable floor or it can be quickly mounted on or removed from the retractable floor.

In another solution, the touching wheel can also be connected with the retractable floor by means of a height adjusting device.

An optimal solution is to implement the height adjusting device by providing a mounting base connected with the underside part of the retractable floor. A rising and falling rebound slide stud is provided inside the mounting base, and the touching wheel is fixed under an underside part of the rebound slide stud. On matching positions, at two sides of the rebound slide stud, there are slanting operating grooves at 180°, and on both ends of each operating groove, separately straight aligning latch notches stretch downward. An alignment pin is arranged through the slanting operating groove to be fixed on the mounting base. The upside part of the rising and falling rebound slide stud has its own fixed adjustment knob, and there is a pressing spring between the adjustment knob and the mounting base.

The invention has the following. advantages compared with the current technologies and machines:

1. Simple structure: the number of the parts of the retractable floor and the adjusting device are limited; furthermore, it can be easily produced, and the closing condition is optimal, due to the telescopic joint construction connecting the floor of the cab with the retractable floor.
2. Easy to control: there is no need to change the traditional driving manner of the old two-wheel motorcycle. When the driver wants to slow down or to stop the motorcycle, the method is so simple that the driver only needs to do a single action that is to stretch out the feet to both sides and step' down the retractable floor. Further, the effort of the driver's feet against the action of the resetting spring of the retractable floor and the reaction forces from the ground can all reach a state of balance. This can guarantee the motorcycle's balance in any road condition and speed. The result is the same result achieved with the old two-wheel motorcycle by driver's feet touching the ground.
3. Safety and Reliability. When you want to slow down or begin driving, your feet need not to touch the ground directly, so the retractable floor could protect your feet from injuries; as a result, it increases the level of safety and comfort of the motorcycle.

DESCRIPTION OF THE PREFERRED EMBODIMENTS

EXAMPLE 1

Figure 1:
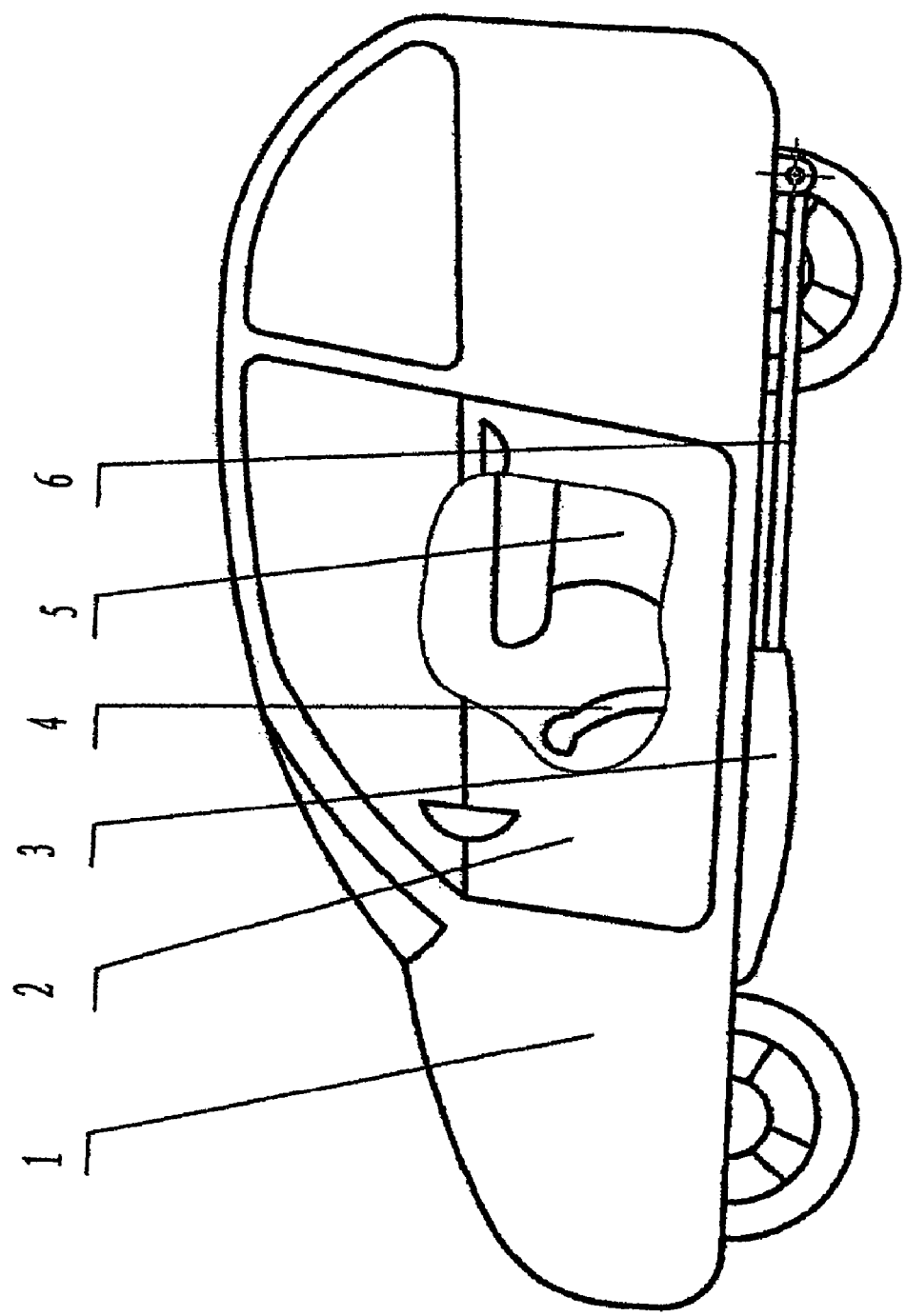
FIG. 1 is a schematic view of the structure of the invention.
Figure 2:
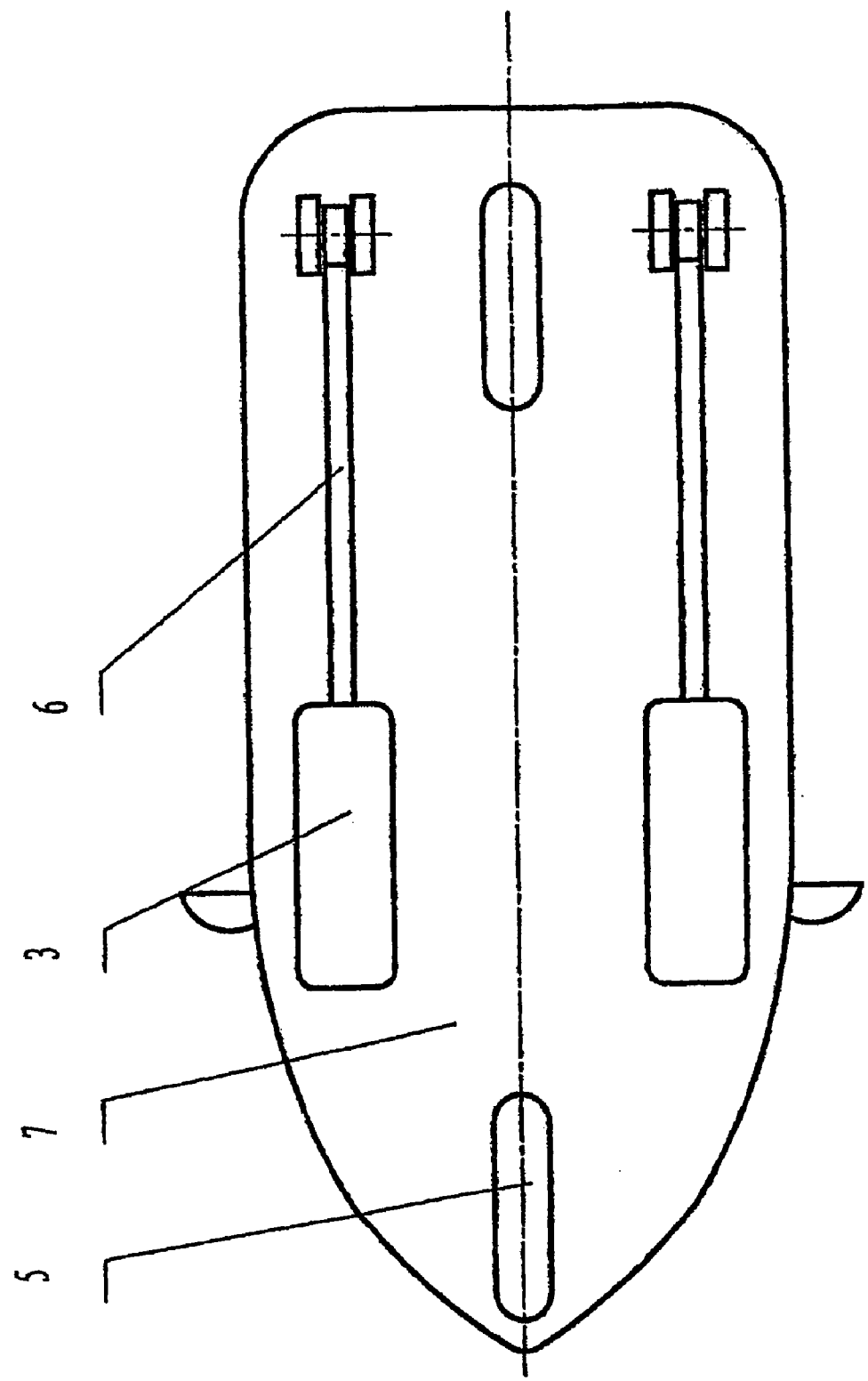
FIG. 2 is a bottom view of FIG. 1.
Figure 3:
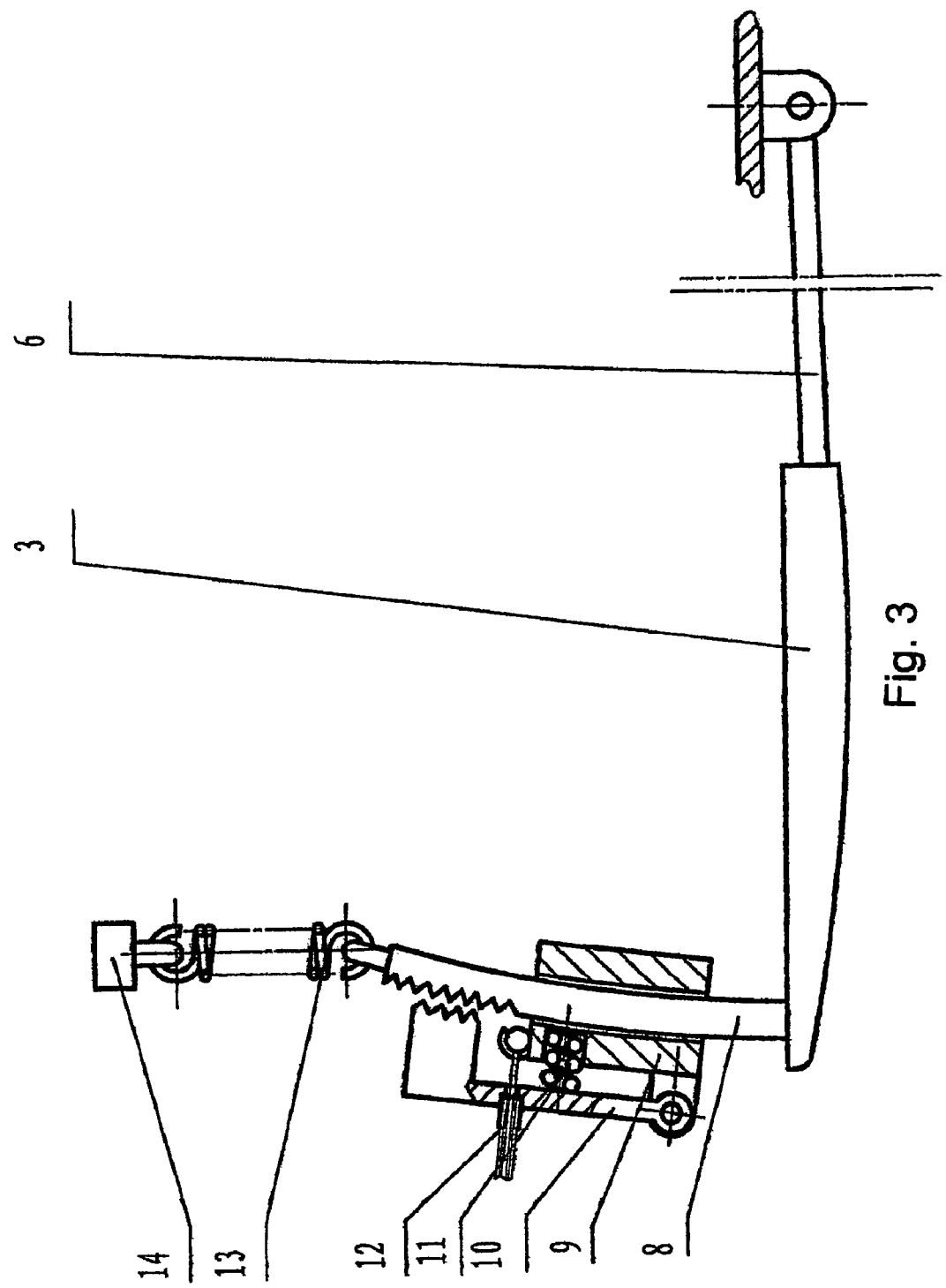
FIG. 3 is a schematic view of the retractable floor and the controlling set.

As shown in FIG. 1, FIG. 2, FIG. 3 and FIG. 4, my invention describes a two-wheel motorcycle 5, including a basic motorcycle, and, around it, a closed cab including, a shell 1, a door 2, and a floor 7. On the floor of the cab, there are retractable floors 3 on both sides, and each retractable floor 3 is connected with the body of the motorcycle by means of a hinge and through a rocker arm 6, so that the retractable floor 3 can be moved up and down using the hinge as axis. The body of the closed motorcycle herein not only includes the true body of the basic motorcycle 5 such as the main structure of the motorcycle, but also includes some parts connected to the true body of the basic motorcycle such as the shell 1, etc.

Therefore, when you want to slow down or stop, you can easily stretch out your feet toward both sides and step down the retractable floor 3 to make it down to the ground. At this time, the effort of your feet can be directed to the ground by the retractable floor 3 so that the balance of the motor is ensured, because it has the same result as the standard motorcycle riding technique. Thus, the drivers needs not to change the manner of riding the motorcycle, furthermore it can prevent your feet from touching the ground directly so that it can protect your feet from injuries with increased safety and comfort of the motorcycle.

An optimal solution is represented by the mentioned retractable floor 3, which can be connected to the back of the body of the motor by the hinge and through the rocker arm 6.

In this example, under the retractable floor 3, a wear-resisting layer is provided, made of wear-resisting materials, such as plastic or rubber. When you step down the retractable floor 3, the wear-resisting layer touches the ground to keep the vehicle in balance.

On the retractable floor 3, a guide rod 8 can be mounted: the guide rod 8 is a vertical stick of curved shape, whose underside part is fixed in the front of the retractable floor 3. In the cab, a guide sleeve 9 cooperates with the guide rod 8, and in which the guide rod 8 can move up and down in the guide sleeve 9. The guide sleeve 9 can be fixed on an internal from section shell 1 for directing the movement of the retractable floor 3.

This invention can provide flexible resetting parts arranged between the retractable floor 3 and the body of the motorcycle, or between the retractable floor 3 and the rocker arm 6, and in which the resetting parts can reset the retractable floor 3 after its operation. In this example, the flexible resetting part includes a resetting spring 13 having one end, which can be mounted on the guide rod 8, and another end, which can be mounted on a hook 14 fixed on the shell 1 of the motorcycle.

In this invention, you can put a locking set on the guide sleeve 9 matching with the guide rod 8 to lock the guide rod 8, and the locking set can be actuated automatically or manually.

As a concrete example, the locking set is manually actuated and is connected through a hinge with the guide sleeve 9. It includes a locking brake 10 matching with the guide rod 8, a steel chain 12 controlling the locking brake 10 on the guide sleeve 9, and in which the other end of the steel chain 12 is connected with a lock handle 4. A return spring 11 for the locking brake is provided between the guide sleeve 9 and locking brake 10. The lock between the locking brake 10 and the guide rod 8 can be realized by the current lock structure, like setting a guide groove on one side of the locking brake 10 or the guide rod 8, and on the other side setting a matching aligning block, setting such aligning block in the guide groove so that it can lock the guide rod 8. An optimal solution can include locking gears of the locking brake 10 matching with the upside part of the guide rod 8, and teeth arranged on the guide rod 8 matching with the locking brake 10. When the gears correctly engage with each other, the guide rod 8 is locked.

In this manner, when you want to stop the motor, you can fix the steel chain 12 by pulling the lock handle 4 in order to make the gear of the locking brake 10 and the guide rod 8 correctly engage with each other so that it can lock the guide rod 8. While loosing the lock handle 4, it can open the guide rod 8 under the action of the resetting spring 11 to make the locking brake 10 and guide rod 8 spaced apart.

Figure 4:
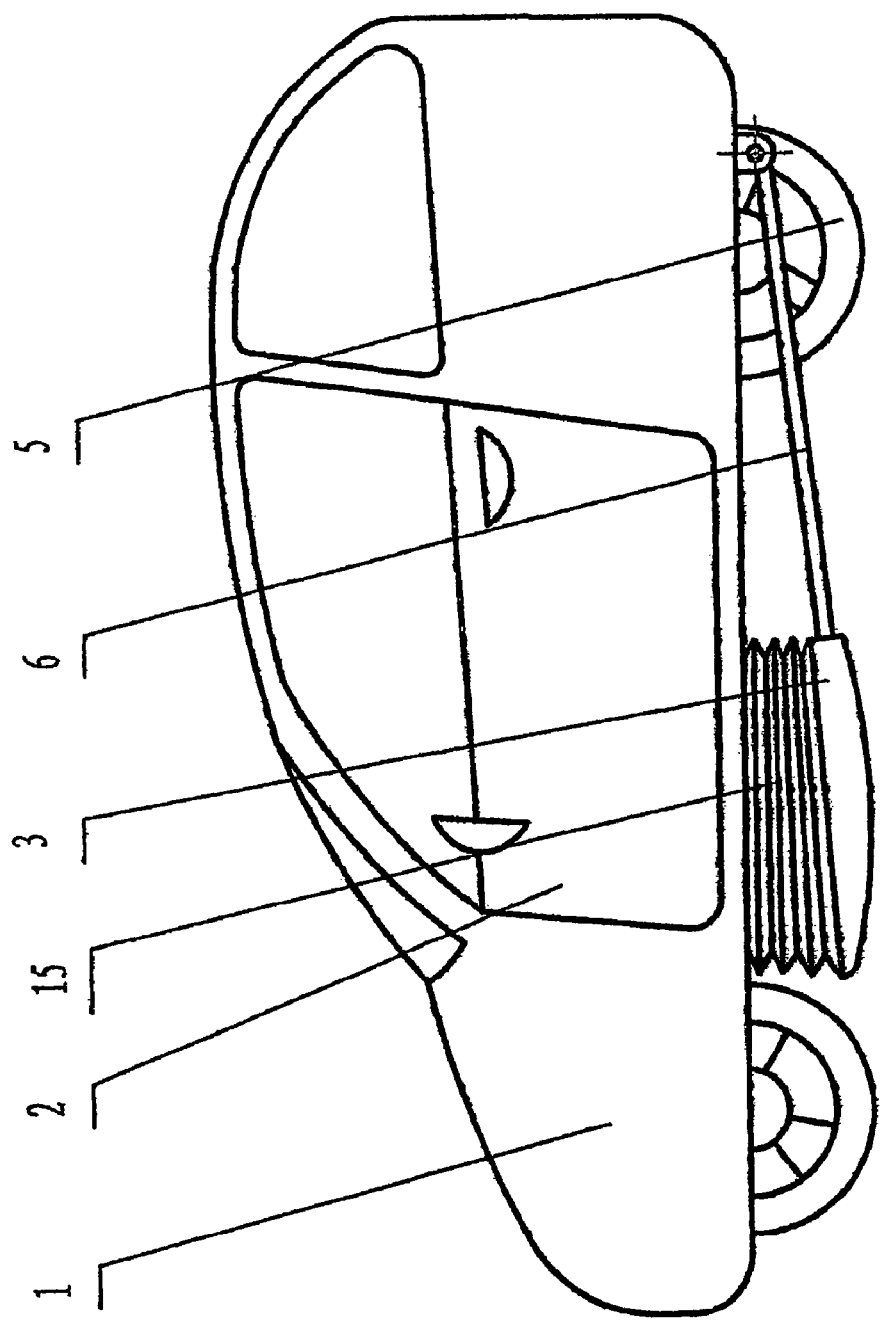
FIG. 4 is a schematic view of the retractable floor when it is falling down.
Figure 5:
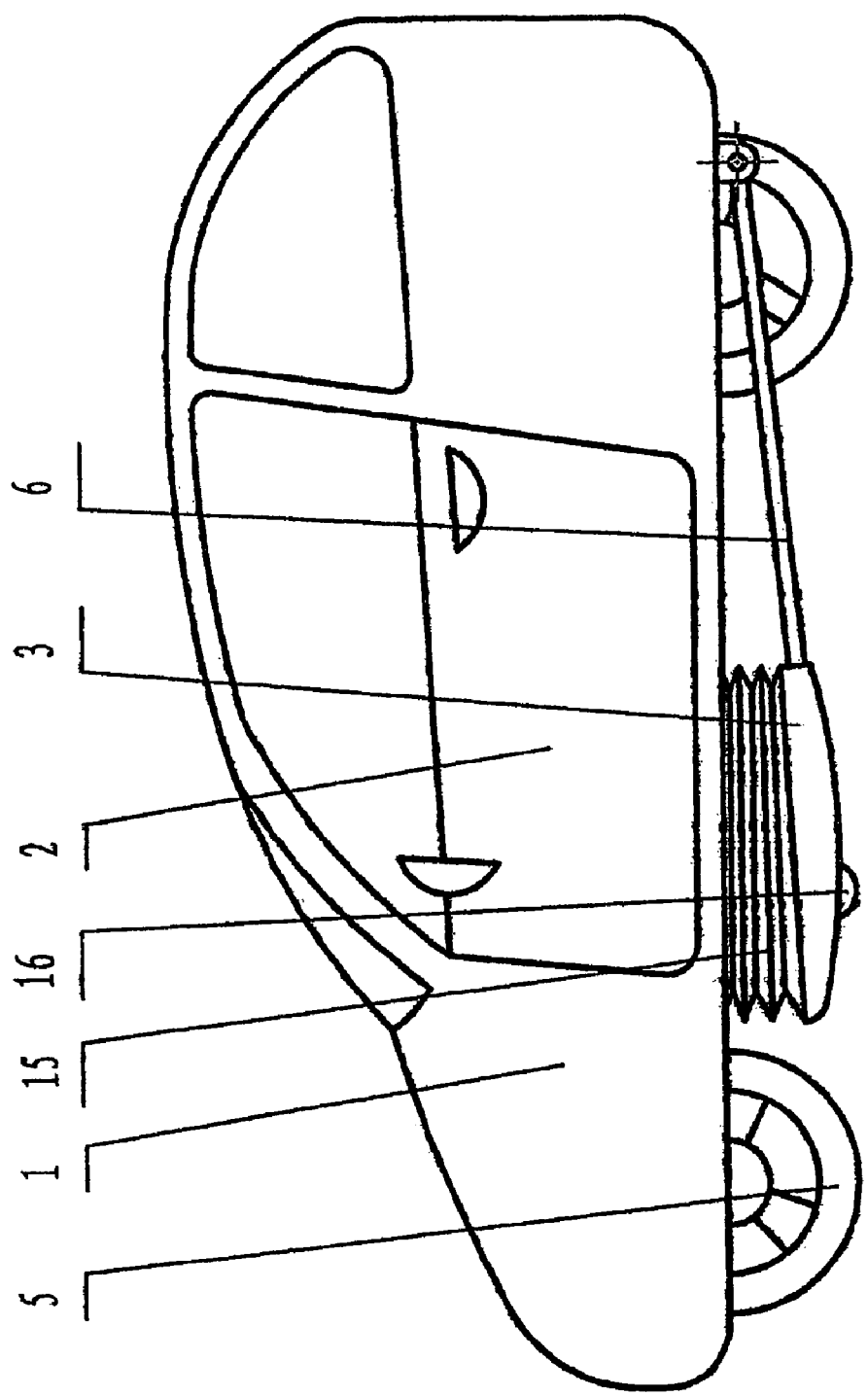
FIG. 5 is a schematic view of a second example of the retractable floor of FIG. 4.

In this invention, as shown in FIG. 4 and FIG. 5, the motorcycle can be equipped with a telescopic joint construction 15 between the floor of the cab 7 and the retractable floor 3 in order to keep the cab closed. In this example, the mentioned telescopic joint construction 15 can be made of a rubber cover with a sleeve. The telescopic joint construction 15 can also be made up of many small parts connected with each other. The upper part of the telescopic joint construction is connected with the floor of the cab and the underside part is connected with the retractable floor 3, so that it can keep the cab closed when the retractable floor 3 is moving up and down.

The driving manner of this invention is the same as the one for a traditional two-wheel motorcycle. When you are to slow or stop the motorcycle, you can just step down the retractable floor 3 and make its bottom touch the ground; at this time the force used by your feet through the retractable floor 3 is directed to the ground so that it can balance the vehicle. After the vehicle comes to a complete stop, you can fix the guide rod 8 by moving the lock handle 4 to make the gears of the locking brake 10 and the guide rod 8 engage with each other, so that it can fix the retractable floor 3 and keep the motorcycle in the condition of park. While you start driving, you should firstly put your feet on the retractable floor 3, and then loose the lock handle 4 so as to make the gears on the locking brake 10 and the guide rod 8 unlock, after that, begin driving the motor and raise your feet into the driving position.

Since the portion touching the ground is fairly large a safe stop can be achieved on uneven surfaces as well as other types of unusual surfaces such as sand, grass, snowy roads, muddy and wet roads.

EXAMPLE 2

The general structure and the effect of this example 2 are similar to the ones of the example 1, so the description is omitted herein.

As shown in FIG. 5, the difference between this example 2 and the example 1 is that, there is a touching wheel 16 on the retractable floor 3. When the driver steps down the retractable floor 3, the retractable floor 3 can touch the ground by means of the touching wheel 16, so it can balance the motorcycle. The touching wheel 16 is more suitable for hard and smooth road, such as city driving.

A castor wheel is firstly chosen as touching wheel in order to fit for an action of the retractable floor 3 independent of the direction after it touches the ground.

The touching wheel 16 can be mounted under the retractable floor 3 and quickly mounted and removed for being connected with the underside part of the retractable floor 3. The driver could use the touching wheel according to the condition of the road. If on the hard and smooth road, it could mount the touching wheel 16, while if driving on uneven pavement he could remove the touching wheels.

EXAMPLE 3

The general structure and the effect of this example 3 are similar to the ones of the example 2, so the description is omitted herein.

Figure 6:
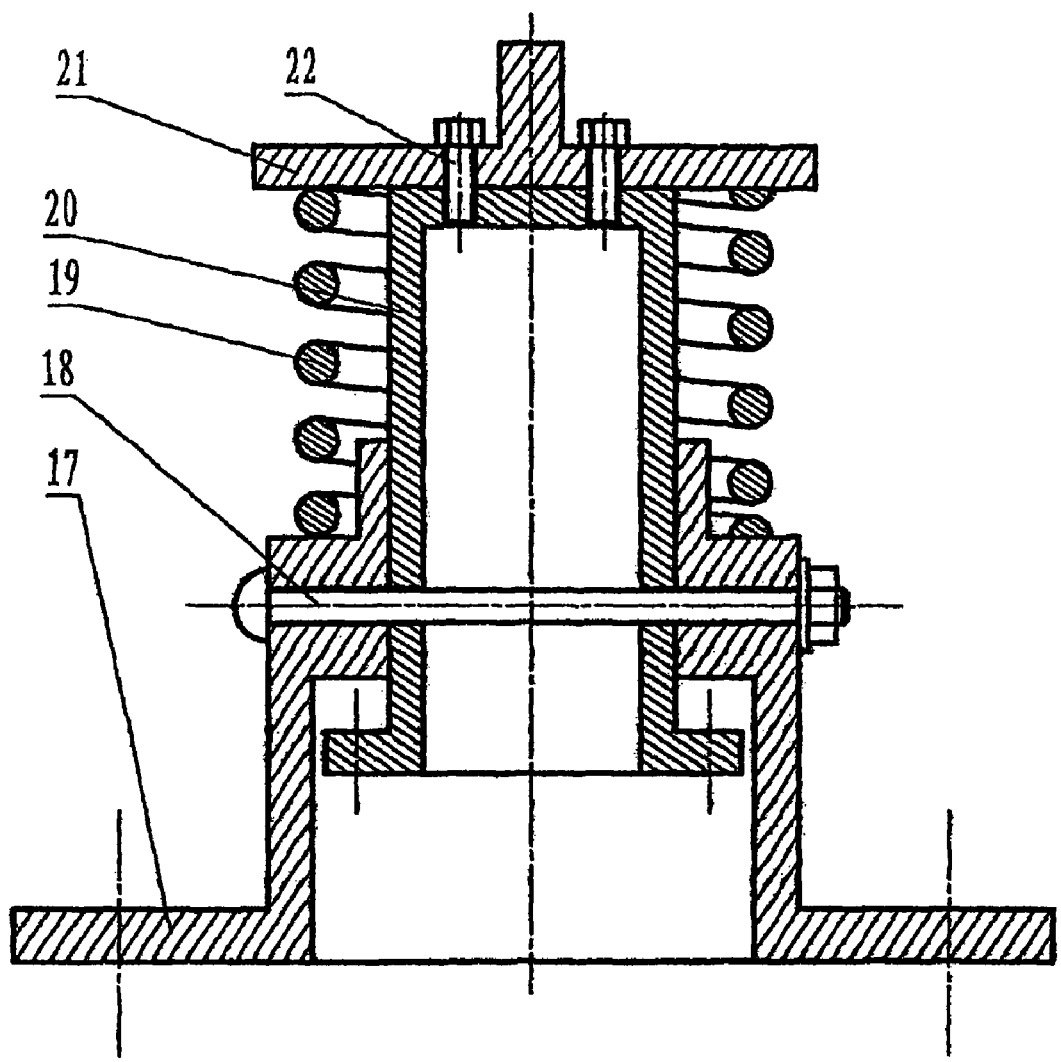
FIG. 6 is a schematic view of a mounting structure for a rebound slide stud of a touching wheel in a third example of the retractable floor.
Figure 7:
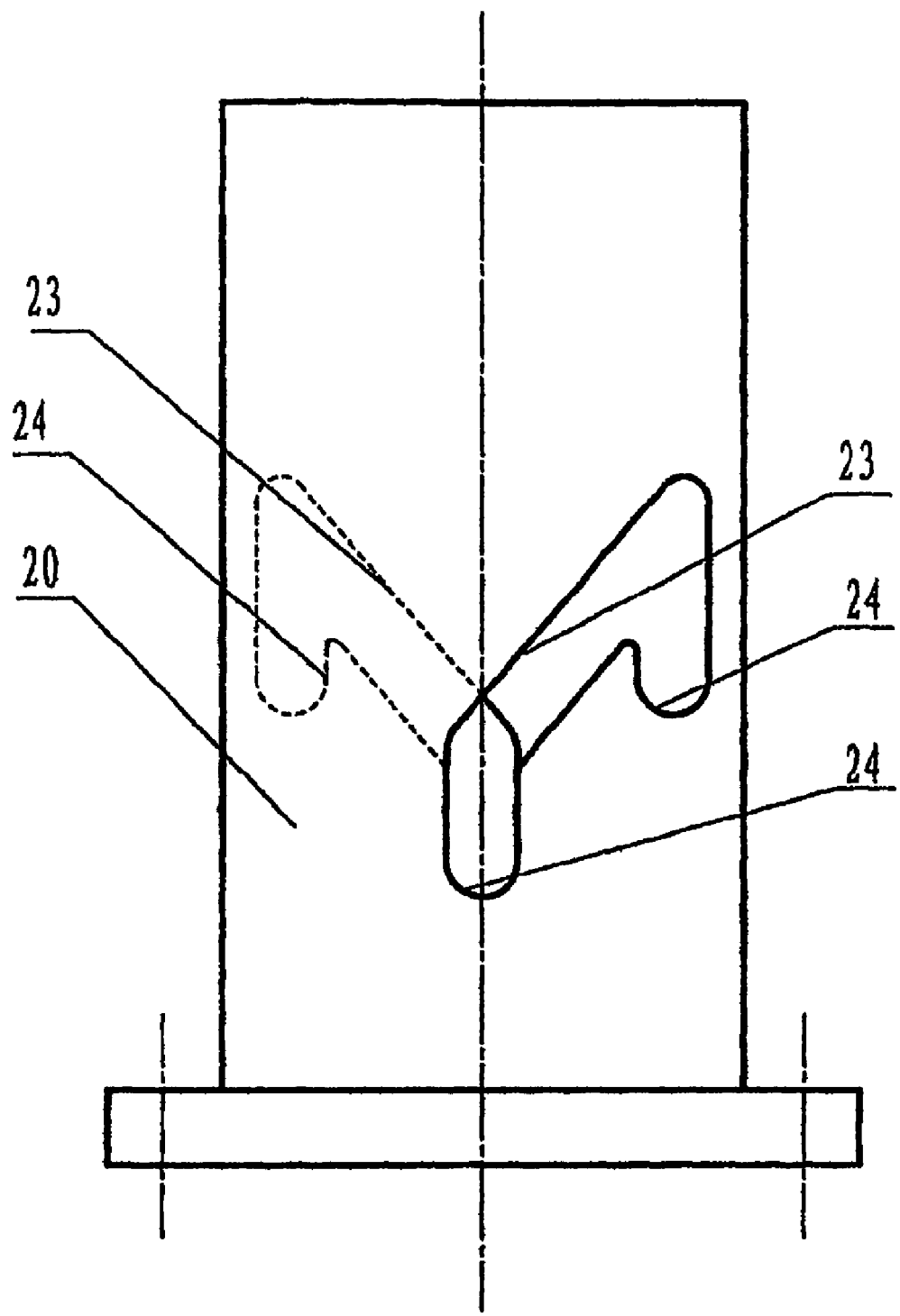
FIG. 7 is a schematic view of rebound slide stud of the touching wheel.

As shown in FIG. 6 and FIG. 7, the difference between this example 3 and, the example 2 is that the touching wheel 16 is connected with the retractable floor 3 by a height adjusting device so that it is allowed to control the rising and falling of the touching wheel 16. As a result, the motorcycle can adapt to different road conditions.

In this example, as shown in FIG. 6 and FIG. 7, the mentioned height adjusting device includes a mounting base 17 connected to the underside part of the retractable floor 3 and lodging a rising and falling rebound slide stud 20. On matching positions of both sides of the rebound slide stud 20 there are slanting operating groove 23 spaced of 180° each other, and, downwards on both ends of each operating groove, a straight aligning latch notch 24 is provided. An aligning pin 18 is fixed on the mounting base 17 by the slanting operating groove 23. The upside part of the rising and falling rebound slide stud 20 can fix an adjustment knobs 21 by a fastening pin 22, and it sets the pressing spring 19 between the adjustment knob 21 and the mounting base 17, while the touching wheel 16 is connected to the underside part of the rising and falling rebound slide stud 20. When it needs to adjust the height of the touching wheel, you can press the adjustment knob 21 and turn it around for a certain angle. In the process of turning, the slanting operating groove 23 of the rising and falling rebound slide stud 20 is sliding along the aligning pin 18, so it can move the touching wheel 16 up and down. When the aligning pin 18 is located on one of the two ends of the slanting operating groove 23, the adjustment knob can not be turned around. At this time, loosing the adjustment knob 21, the slanting operating groove 23 of the latch notch 24 of its ends cooperating with the aligning pin 18 is orientated under the effect of fastening spring 19, so you can set the touching wheel 16 on the rising position or the falling position according to the conditions of the road.

In order to avoid stepping on the adjustment knob 21 when stepping down the retractable floor 3, the upper face of the adjustment knob 21 can be arranged at a level lower than the upper face of the retractable floor 3, and also a retractable cover can be arranged on the position of the adjustment knob 21 with respect to the retractable floor 3. The height of the retractable cover can have the same level of the upper face of the retractable floor 3. Usually, the retractable cover is set on the retractable floor 3 and protects the adjustment knob 21 in the retractable floor 3; so, when it needs to adjust the height of the touching wheel, you just could open the retractable cover to use the adjustment knob 21, then you can adjust the height.

The height adjusting device mentioned above represents only one practical example, but many more are applicable.

The examples mentioned above are just real-life examples to explain the invention but not to restrain my invention. For example, the touching wheel 16 also could be mounted on the retractable floor 3 as like a folding structure of the plane: when you do not need the touching wheel 16, you could fold it up.

What I claim is:

1. A closed two-wheel motorcycle comprising a basic motorcycle, a cab arranged around the basic motorcycle and having a shell with a door, a floor, retractable floors for a driver's feet, support members connected to said retractable floors, resetting spring members and locking members, and wherein said support members include respective external rocker arms and sliding elements, said closed two-wheel motorcycle further comprising hinges at a rear section of the two-wheel motorcycle for the external rocker arms, and guide sleeves, mounted on a front section of the cab for guiding said sliding elements;

wherein each retractable floor can be depressed toward a ground by an inclination of the rocker arms around the respective hinges and a sliding of the sliding elements along the guide sleeves; and wherein said resetting members are provided for causing the retractable floors to be reset at a raised rest position upon releasing of the driver's feet;

said locking members being actuatable for holding depressed the respective floors against the action of the resetting members.

2. Thee closed two-wheel motorcycle according to claim 1, further comprising telescopic joint constructions for said retractable floors, wherein each one of said telescopic joint constructions is provided for keeping the cab closed between the floor and the retractable floors, said telescopic joint including an upper section connected with said floor and a lower section connected with a respective retractable floor.

3. The closed two-wheel motorcycle according to claim 1, further comprising hood members with a sleeve for said retractable floors for keeping the cab closed between the floor and the retractable floors, each one of said hood members having an upper section connected with said floor and a lower section connected with a respective retractable floor and which said hood members can be expanded and contracted.

4. The closed two-wheel motorcycle according to claim 3, wherein each one of said hood members includes a plurality of hoods connected together.

5. The closed two-wheel motorcycle according to claim 1, wherein each sliding element comprises a curved sliding rod and wherein each locking member includes a locking brake cooperating with the curved rod, and further providing a steel chain connected with a lock handle to control said locking brake, and a resetting spring for the locking brake operating between the guide sleeve and the locking brake.

6. The closed two-wheel motorcycle according to claim 5, further comprising teeth of the locking brake opposing the curved rod, and wherein said rod includes respective teeth to be engaged by the teeth of the locking brake.

7. The closed two-wheel motorcycle according to claim 1, wherein each resetting member comprises a resetting spring operating between an upper portion of the sliding element and the front section of the cab.

8. The closed two-wheel motorcycle according to claim 1, wherein each of said locking members include a locking brake cooperating, at rest, with the sliding element for holding depressed the retractable floor against the action of the resetting spring.

9. The closed two-wheel motorcycle according to claim 1, further comprising a wear-resisting layer made of wear-resisting materials pasted under an underside face of each retractable floor.

10. The closed two-wheel motorcycle according to claim 1, further comprising touching wheels, each one mounted on an underside section of a respective retractable floor.

11. The closed two-wheel motorcycle according to claim 10, wherein said touching wheels are constituted by castor wheels.

12. The closed two-wheel motorcycle according to claim 10, wherein said touching wheels are fixed to the retractable floors or can be quickly mounted on or removed from the retractable floors.

13. The closed two-wheel motorcycle according to claim 10, wherein each one of said touching wheels is connected with the retractable floor by means of a height adjusting device having an adjustment knob arranged at a level lower than an upper face of the retractable floor.

14. The closed two-wheel motorcycle according to claim 10, wherein each one of said touching wheels is connected with the retractable floor by means of a height adjusting device, said height adjusting device including a mounting tubular base fixing an aligning pin, a rising and falling rebound slide stud having slanting operating grooves, and a fastening spring, wherein the mounting base is connected with an underside part of the retractable floor and lodges said slide stud and wherein the touching wheel is fixed on an underside part of the rising and falling rebound slide stud, while the adjustment knob is mounted on an upper portion of the slide stud;

wherein the slanting operating grooves are arranged at 180° each the other, provide straight aligning latch notches on lower and upper ends of said grooves and cooperate slidably with the aligning pin; and wherein the fastening spring is arranged between the adjustment knob and the mounting base;

the rotation of said adjustment knob causing the lowering and rising of the touching wheels up to the reaching of the lower and upper ends, while the latch notches causing the locking of the slide stud on reached lower and upper positions of the touching wheels.

15. A closed two-wheel motorcycle comprising a basic motorcycle, a cab arranged around the basic motorcycle and having a shell with a door, a floor, retractable floors for a driver's feet, and support members, resetting members and locking members for said floors, and wherein said support members include respective external rocker arms and sliding elements, said closed two-wheel motorcycle further comprising hinges at a rear section of the two-wheel motorcycle for the external rocker arms and guide sleeves, mounted on a front section of the cab for guiding said sliding elements;

wherein the retractable floors can be depressed toward a ground by means of the external rocker arms and are further guided through a sliding of the sliding elements on the guide sleeves; and wherein each resetting member comprises a resetting spring operating between an upper portion of a respective sliding element and the front section of the cab;

each of said locking members include, a locking brake cooperating, at rest, with the sliding element for holding depressed a respective retractable floor against the action of the resetting spring.

16. The closed two-wheel motorcycle according to claim 15, wherein each sliding element comprises a curved rod and wherein each locking brake cooperates with the respective curved rod, further including a steel chain connected with a lock handle to control said locking brakes, while a respective resetting spring is provided for a resetting action of each locking brake.

17. The closed two-wheel motorcycle according to claim 15 further comprising teeth of each locking brake opposing the sliding element, and wherein each sliding element includes respective teeth to be engaged by the teeth of the locking brake.

* * * * *